Dec. 25, 1945.  E. C. PHILLIPS  2,391,477
SELF-SEALING FUEL TANK
Filed July 11, 1941
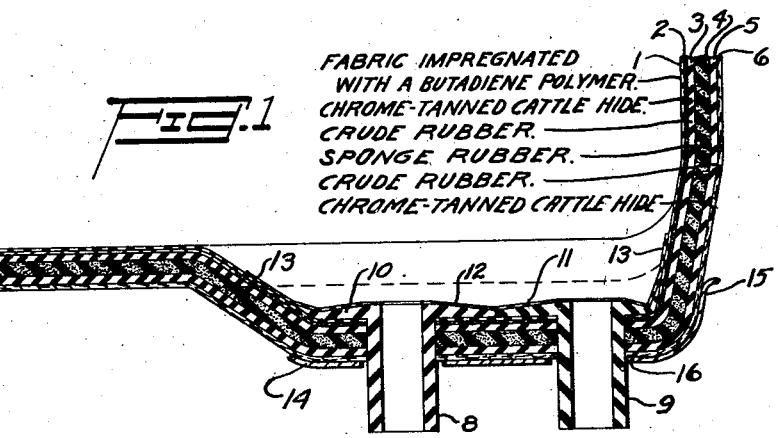
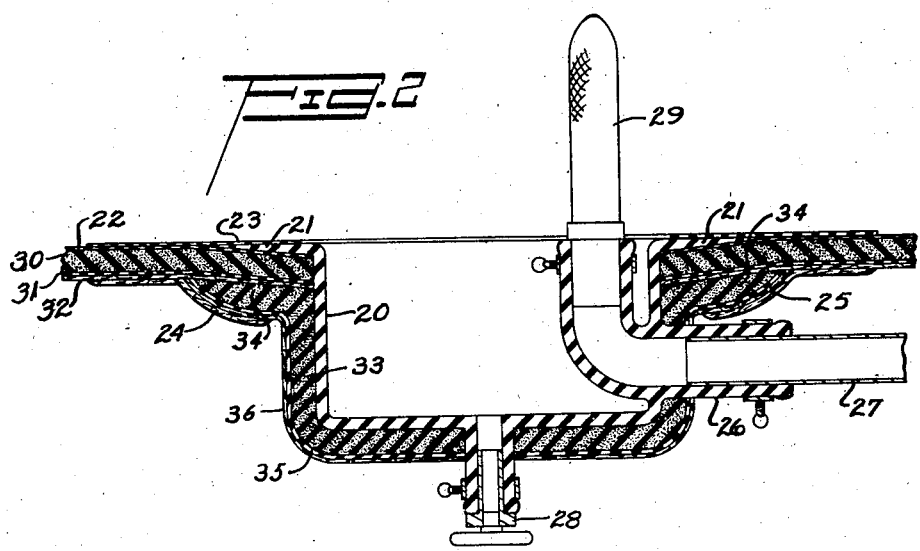
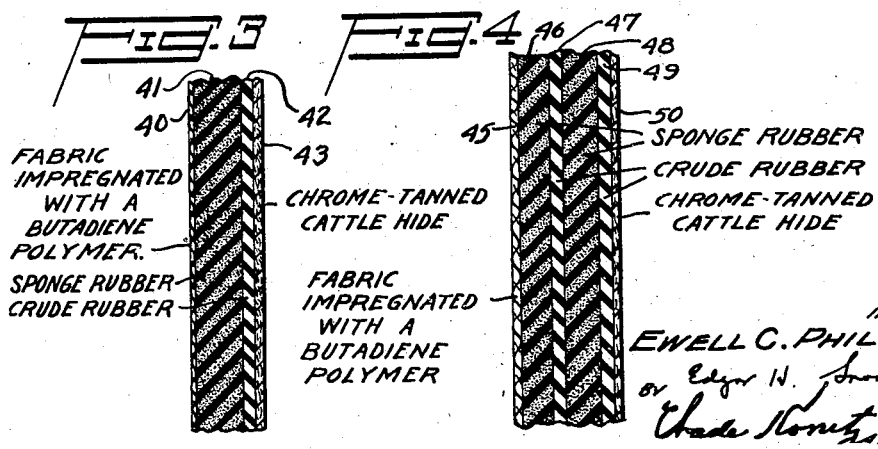
INVENTOR
EWELL C. PHILLIPS Patented Dec. 25, 1945

2,391,477

UNITED STATES PATENT OFFICE 2,391,477

SELF-SEALING FUEL TANK

Ewell C. Phillips, Dayton, Ohio

Application July 11, 1941, Serial No. 401,990

7 Claims. (Cl. 154—43.5)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to self-sealing fuel and oil tanks for use in aircraft.

Previous attempts have been made to provide self-sealing gasoline tanks on aircraft. Most of these attempts have resulted in a self-sealing cover to be used in connection with the ordinary metal gasoline tank. While these cover devices have enjoyed a certain amount of success, they perform more satisfactorily on the side where the bullet or projectile enters the tank than they do on the side where the bullet leaves the tank. At this latter location, as is well known to those who have observed the passage of a projectile through a metal container, the opening made by the projectile as it leaves the container is usually much larger than where it enters the container, and there are nearly always present jagged, projecting edges which tend to mutilate any self-sealing cover used in connection with a metal tank.

It is therefore an object of this invention to provide a prefabricated tank having sufficient strength to support the weight of gasoline or fuel to be placed therein, which will have a high resistance to tear and which will have high self-sealing properties.

It is a further object of this invention to provide a flexible, self-sealing tank which can be retained within the structure of the aircraft in a manner somewhat similar to that disclosed in the patent to Gray et al. 2,102,590, issued December 1, 1937, but one in which the fittings, such as the vents, sumps, tank outlets, etc., are loosely received in the supporting structure.

It is a further object of this invention to provide a new and novel connection between the fittings and the tank proper.

In the drawing:

Fig. 1 is a cross-sectional view through a part of the tank showing the parts composing the tank as well as an outside connection to the tank.

Fig. 2 is a cross-sectional view of a sump and its connection to a tank.

Figs. 3 and 4 are sectional views through modified forms of tank wall structure.

As stated in the objects of invention, the tank constituting the subject matter of this invention has novel weight-carrying, tear-resisting, shock-absorbing, and self-sealing properties. Referring to Fig. 1 of the drawing, the inner two layers of the tank comprising a layer of fabric 1 impregnated with a butadiene polymer such as neoprene, and a layer of cattle hide 2 are designed to carry the weight of the tank and the contents thereof. Neoprene is not affected chemically by hydrocarbon fluids such as gasoline or oils, and cattle hide has high tear-resisting properties as well as the restorative property of returning to its original shape after being stretched. The layer of cattle hide 2 functions to prevent tearing of the rubber and promote self-sealing.

Next to the layer of cattle hide is a layer of crude-rubber 3 which may be in the form of a latex sheet of uncured rubber having similar properties to crude rubber but made in large sheets. It is well known that crude rubber has a high resistance to tear and will become tacky and sticky upon contact with gasoline and, when punctured, will be self-sealing in the presence of gasoline if the puncture or tear is not too large.

Adjacent the layer of crude rubber is a layer of sponge rubber 4 which functions to absorb pressure resulting from movement of a projectile passing through the tank as well as the force exerted by the projectile in piercing the tank. The sponge rubber provides flexibility to the tank and allows the crude rubber sheet to stretch and move separately. Then a layer of crude rubber 5 is applied to the layer of sponge rubber. This crude rubber functions similarly to the layer of crude rubber 3. Lastly, there is provided a layer of cattle hide 6, chrome-tanned so as to be more flexible and to have a high degree of elongation, as well as having high tear-resisting properties and the restorative property of regaining its original shape when stretched or punctured. As used herein the word restorative is defined as the property of the material which enables it to tend to return to its original shape and condition.

The tank may be made of different combinations of materials, such as, for instance, in Fig. 3 there is shown an inner layer of neoprene-impregnated fabric or other material 40, a layer of shock-absorbing sponge rubber 41, a layer of crude rubber 42, and a layer of cattle hide 43, the latter being preferably chrome-tanned.

Where greater shock-absorbing properties are desired, an arrangement such as shown in Fig. 4 is provided. In that figure the structure of the tank wall is composed of a layer of tank-carrying material such as neoprene-impregnated fabric 45, a layer of sponge rubber 46, a layer of crude rubber 47, another layer of sponge rubber 48, another layer of crude rubber 49, and lastly a layer of chrome-tanned cattle hide 50.

Coming now to another feature of the invention, it has been discovered that where flexible gasoline tanks are contained or supported in an airplane, difficulty is encountered with the tearing away of the tank from the fittings when the fittings are made rigid with the airplane structure. To obviate this difficulty, the fittings—such as the vents, sumps, etc.—are made of a form of rubber chemically inactive with hydrocarbon fluids, attached to the tank in a new and novel manner, and allowed to extend through structure which aids in supporting the tank—such as 15 in Fig. 1—with sufficient clearance, as at 16, to permit relative movement between the fittings and the aircraft structure and thus prevent rupture or separation of the fittings from the tank.

Coming now to the feature of securing the outlets to the tank, there is shown in Fig. 1 a pair of outlet members 8 and 9 having their respective flanged portions 10 and 11 positioned interiorly of the tank and fixed with respect thereto by cementation to the layer 1 and by the superimposition and cementation to the flanged portions 10 and 11 of a sheet of material 12 having properties similar to material 1 and having a portion 13 extending beyond and cemented directly to the layer 1. Sheet 12 is provided with openings corresponding to the openings in outlet members 8 and 9. Cemented to the outer layer of cattle hide is another layer of cattle hide which functions to provide additional strength to the area adjacent the outlet.

A new and novel arrangement of parts for attaching a sump to the tank is illustrated in Fig. 2. Referring to that figure, a sump member 20 composed of hard rubber is provided with a flanged portion 21 cemented to the fabric or other layer 22. A sheet of fabric, tape, or the like 23 is provided to overlie and be cemented to flange portion 21. This layer is sufficiently large so as to have a portion cemented directly to the layer 22. An additional layer of cattle hide is provided at 24 and 25 to assist in supporting the sump. The sump is provided with an outlet screen 29, an outlet portion 26 to which a pipe 27 is suitably clamped, and a drain plug referred to generally as 28. The tank proper in this form of the invention is composed of the layer of weight-carrying fabric 22, a sponge rubber layer 30, a crude rubber layer 31, and a layer of chrome-tanned cattle hide 32. A sponge rubber covering 33 is provided with a flange 34 by which it is secured around the outside of sump 20. A layer of crude rubber 35 is cemented outside of sponge rubber covering 33, and a layer of cattle hide 36 is placed outside of layer 35. Layers 24 and 25 are then placed outside of and are cemented to layer 36 so as to unite the several parts. The sponge rubber layer 33, with the covering layers 35 and 36 are all properly perforated to fit snugly around drain plug 28.

It will be understood that the invention is in no way restricted to the particular examples quoted, and may also be employed in the case of vessels and containers of desired form for manifold purposes. Various modifications are therefore possible within the meaning of the above description and the annexed claims without departing from the spirit of the invention.

What I claim as new and desire to secure by Letters Patent is:

1. A container for liquids comprising an inner layer of fabric impregnated with a butadiene polymer and a layer of cattle hide, said two layers having sufficient strength to support the weight of the container and the contents thereof, a layer of shock-absorbing sponge rubber, a layer of crude rubber, and an outer layer of chrome-tanned cattle hide.

2. A container for hydrocarbon liquids comprising in sequence an inner layer of fabric impregnated with a butadiene polymer, a layer of sponge rubber, a layer of sheet latex composed of uncured rubber, and an outer layer of cattle hide.

3. In a self-sealing tank of pliant material having an inner weight-carrying layer of fluid-proof material chemically inactive with hydrocarbon fluids, intermediate layers of shock-absorbing material and self-sealing material chemically active with hydrocarbon fluids and an outer layer of material having high stretchable, tear-resisting, and restorative properties, sump means for said tank, said sump means comprising a sump member having a flanged portion receivable interiorly of said tank, a layer of material chemically inactive with hydrocarbon fluids secured to and arranged to overlap said flanged portion and a portion of said tank, said sump means further comprising a covering for said sump having shock-absorbing and self-sealing properties, said covering having a flanged portion overlying said tank proper and a strip of material having high stretchable, tear-resisting, and restorative properties secured to and overlapping said last-named flanged portion and a portion of said tank.

4. A container for hydrocarbon liquids comprising, in sequence, an inner layer of fabric impregnated with a butadiene polymer, a layer of sheet latex composed of uncured rubber, a layer of sponge rubber, a layer of sheet latex composed of uncured rubber, and an outer layer of cattle hide.

5. A container for hydrocarbon liquids composed of an inner layer of liquid-proof material, chemically inactive with hydrocarbon liquids and having sufficient strength to sustain the container and contents thereof, and, in succession, a layer of chrome-tanned cattle hide, a layer of crude rubber, a layer of shock-absorbing sponge rubber, a second layer of crude rubber and an outer layer of chrome-tanned cattle hide.

6. A non-metallic flexible container for hydrocarbon liquids composed of an inner layer of liquid-proof fabric chemically inactive with hydrocarbon liquids and having sufficient strength to sustain the container and contents thereof and, in succession, a layer of shock-absorbing sponge rubber, a layer of crude rubber and a layer of chrome-tanned cattle hide.

7. A non-metallic flexible container for hydrocarbon liquids composed of a layer of liquid-proof fabric impregnated with a butadiene polymer and having sufficient strength to sustain the container and contents thereof and, in succession, a layer of crude rubber, a layer of shock-absorbing material and a layer of chrome-tanned cattle hide.

EWELL C. PHILLIPS.